431-104

DRAFTSMAN.

No. 11,851. Reissued Sept. 4, 1900.

A. KITSON.

VAPOR TUBE HEATER.

(Application filed June 26, 1900.)

2 Sheets—Sheet 1.

WITNESSES:

Lilliam C. Pearson

W. H. Pumphrey

INVENTOR

Arthur Kitson

BY A. Parkerhurst

ATTORNEY

THE NORRIS PETERS CO., PHOTO-LITHO., WASHINGTON, D. C.

No. 11,851.

Reissued Sept. 4, 1900.

A. KITSON.

VAPOR TUBE HEATER.

(Application filed June 26, 1900.)

2 Sheets—Sheet 2.

WITNESSES:

William A. Pearson

W. H. Humphrey.

INVENTOR

Arthur Kitson

BY

A. Walkerdine

ATTORNEY

THE NORRIS PETERS CO., PHOTO-LITHO., WASHINGTON, D. C.

UNITED STATES PATENT OFFICE.

ARTHUR KITSON, OF PHILADELPHIA, PENNSYLVANIA, ASSIGNOR TO THE KITSON HYDROCARBON HEATING AND INCANDESCENT LIGHTING COMPANY, OF SAME PLACE AND CHARLESTON, WEST VIRGINIA.

VAPOR-TUBE HEATER.

SPECIFICATION forming part of Reissued Letters Patent No. 11,851, dated September 4, 1900.

Original No. 650,899, dated June 5, 1900. Application for reissue filed June 26, 1900. Serial No. 21,685.

*To all whom it may concern:*

Be it known that I, ARTHUR KITSON, a subject of the Queen of Great Britain, and a resident of Philadelphia, county of Philadelphia, State of Pennsylvania, have invented certain new and useful Improvements in Vapor-Tube Heaters, of which the following is a specification.

My invention relates to vapor-burning lamps; and it consists of an improved arrangement of Bunsen burner and pilot-light for starting said lamps into operation.

The preferred form of my apparatus is illustrated in the accompanying two sheets of drawings, in which—

Figure 1:
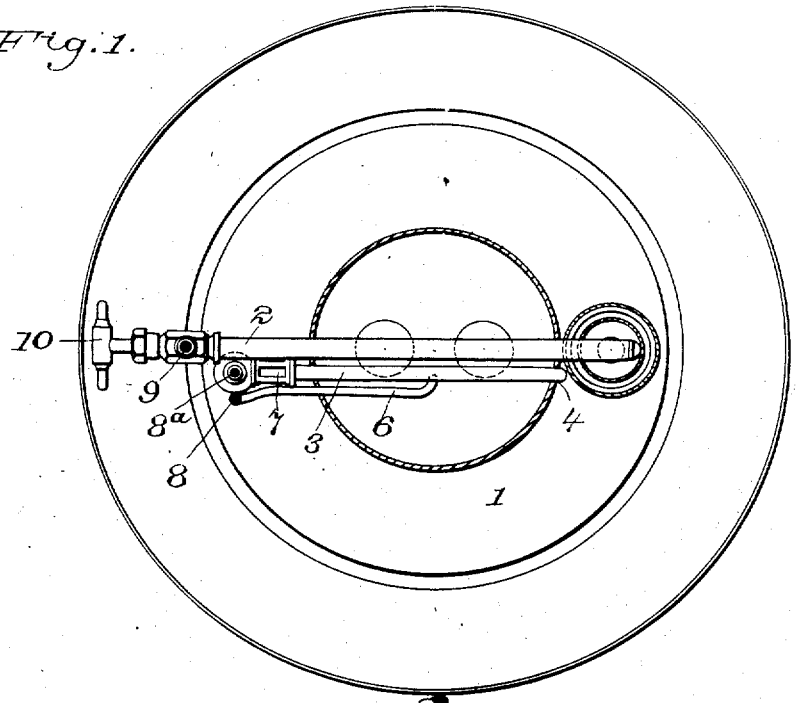
Figure 2:
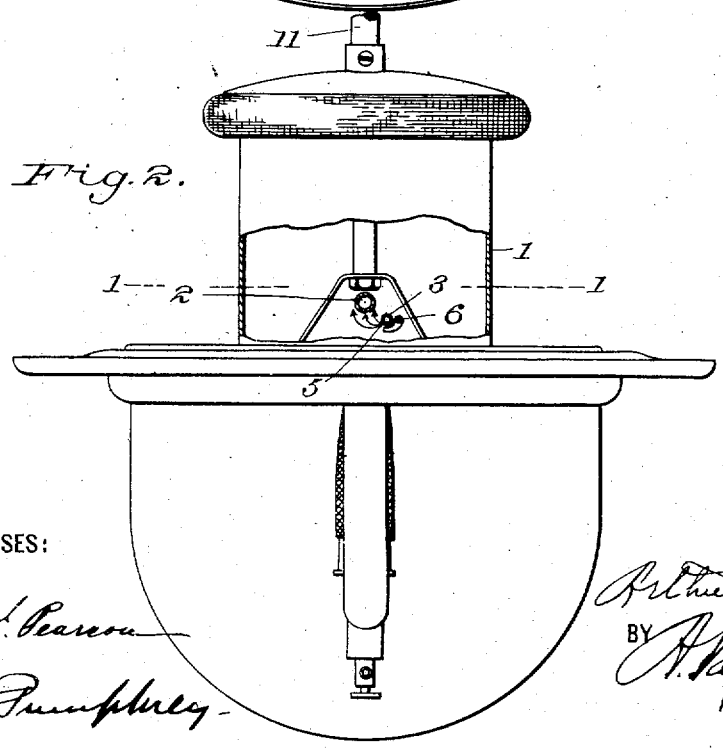
Figure 3:
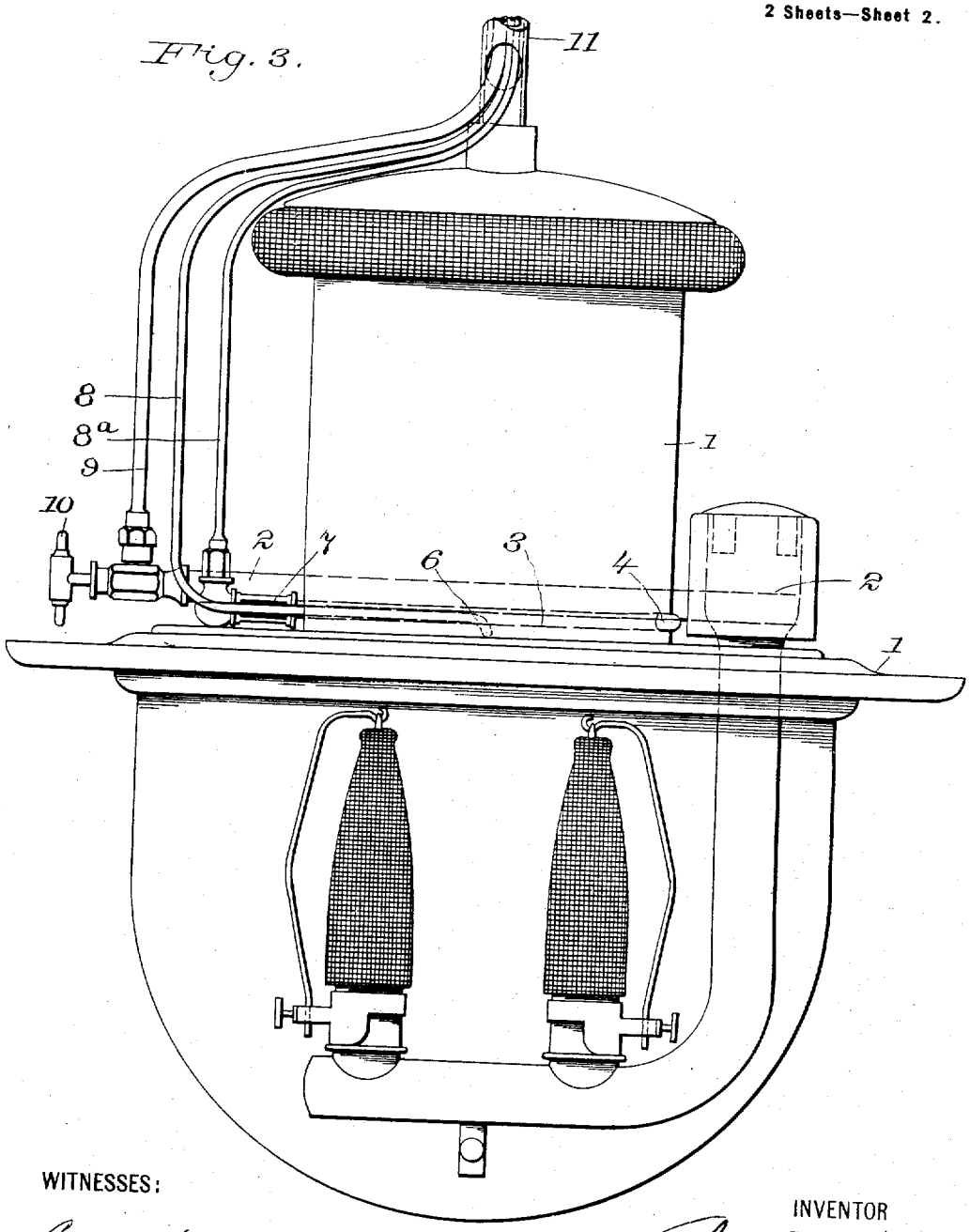

Figure 1 is a horizontal section, looking down, on line 11 of Fig. 2. Fig. 2 is a side elevation and partial section of the lamp with my improved Bunsen burner attached. Fig. 3 is a second elevation at right angles to the plane of Fig. 2.

Throughout the drawings like reference-figures refer to like parts.

The lamp shown has the ordinary main frame 1, in which is mounted the horizontal vaporizing-tube 2. Parallel to this vaporizing-tube and preferably to one side and slightly below the same I arrange the Bunsen burner 3, which has its end 4 closed and a series of perforations 5 or a slit on the side adjacent to the vaporizing-tube and so located that the jet or jets issuing therefrom will impinge on the vaporizing-tube. Preferably I have said discharge-openings point slightly downward, so that the flame will be carried down and then up, entirely surrounding the vaporizing-tube. Below the Bunsen burner and adjacent to one of the discharge-orifices is located the pilot-light 6.

Gas is supplied to the pilot-burner by a tube 8 and to the Bunsen burner by a second tube 8[a]. Oil is supplied to the vaporizing-tube by a tube 9 and the supply controlled by a valve 10. The oil and gas tubes may be conducted through a tubular suspension-rod 11.

The mode of operation of my invention is obvious from the foregoing.

The pilot-burner 6 burns continuously with a small flame. On turning the gas on to the Bunsen burner 3 the ordinary mixture of gas and air is formed by means of air drawn in through the adjustable opening 7 and the mixture issues from the orifices 5, is ignited by the pilot-burner, and burns in a blue flame, which is carried up by the current of hot air in the direction shown by the arrows and so bathes completely the entire length of the vaporizing-tube and quickly raises the same to the temperature necessary to vaporize the oil when the same is admitted. After this the gas is shut off the Bunsen burner and the lamp continues to burn vapor in the well-known manner.

It is evident that various changes could be made in the details of construction illustrated without departing from the spirit and scope of my invention so long as the relative arrangement of parts shown in the drawings or the principle of operation described in the specification is preserved. The position of the Bunsen burner might be varied slightly so long as the flame was caused to impinge on the vaporizing-tube. The character of the discharge-openings might be changed. Other modes of supporting the Bunsen burner might be employed, &c.; but all these I consider changes of form and not of substance and still within the scope of my invention.

Having therefore described my invention, what I claim as new, and desire to protect by Letters Patent, is—

1. In a vapor-burning apparatus the combination of an oil-supply pipe, a vaporizing-tube connected thereto, a gas-supply pipe, a Bunsen burner comprising a tube parallel to the vaporizing-tube and connected to the gas-supply pipe, and provided with one or more openings so located that jets of flame projecting therethrough will impinge on the vaporizing-tube.

2. In a vapor-burning apparatus the combination of the main frame, the horizontal vaporizing-tube therein, the Bunsen burner comprising a tube arranged parallel to the vaporizing-tube, said burner having its end closed but provided with one or more discharge-openings in the side adjacent to the vaporizing-tube, an oil-supply pipe connected to the vaporizing-tube and a gas-supply pipe connected to the Bunsen burner.

3. In a vapor-burning apparatus the combination of the main frame, the horizontal vaporizing-tube therein, the Bunsen burner arranged parallel to the vaporizing-tube, said burner having its end closed, but provided with one or more discharge-openings in the side adjacent to the vaporizing-tube, said openings discharging slightly downward, an oil-supply pipe connected to the vaporizing-tube, and a gas-supply pipe connected to the Bunsen burner.

4. In a vapor-burning apparatus, the combination of the vapor-burner and oil-supply pipe, a vaporizing-tube connected thereto, a gas-supply pipe, and a Bunsen burner separate from the vapor-burner connected to the gas-supply pipe, and so located that the flame from the Bunsen burner impinges on all parts of the vaporizing-tube exposed to the flame of the vapor-burner.

Signed by me at New York city, New York, this 19th day of June, 1900.

ARTHUR KITSON.

Witnesses:

W. H. PUMPHREY,

L. E. PEARSON.